Sept. 24, 1929.  A. KOHL  1,729,045
POWER TRANSMITTING ATTACHMENT FOR MOTOR VEHICLES
Filed Aug. 2, 1926  2 Sheets-Sheet 2
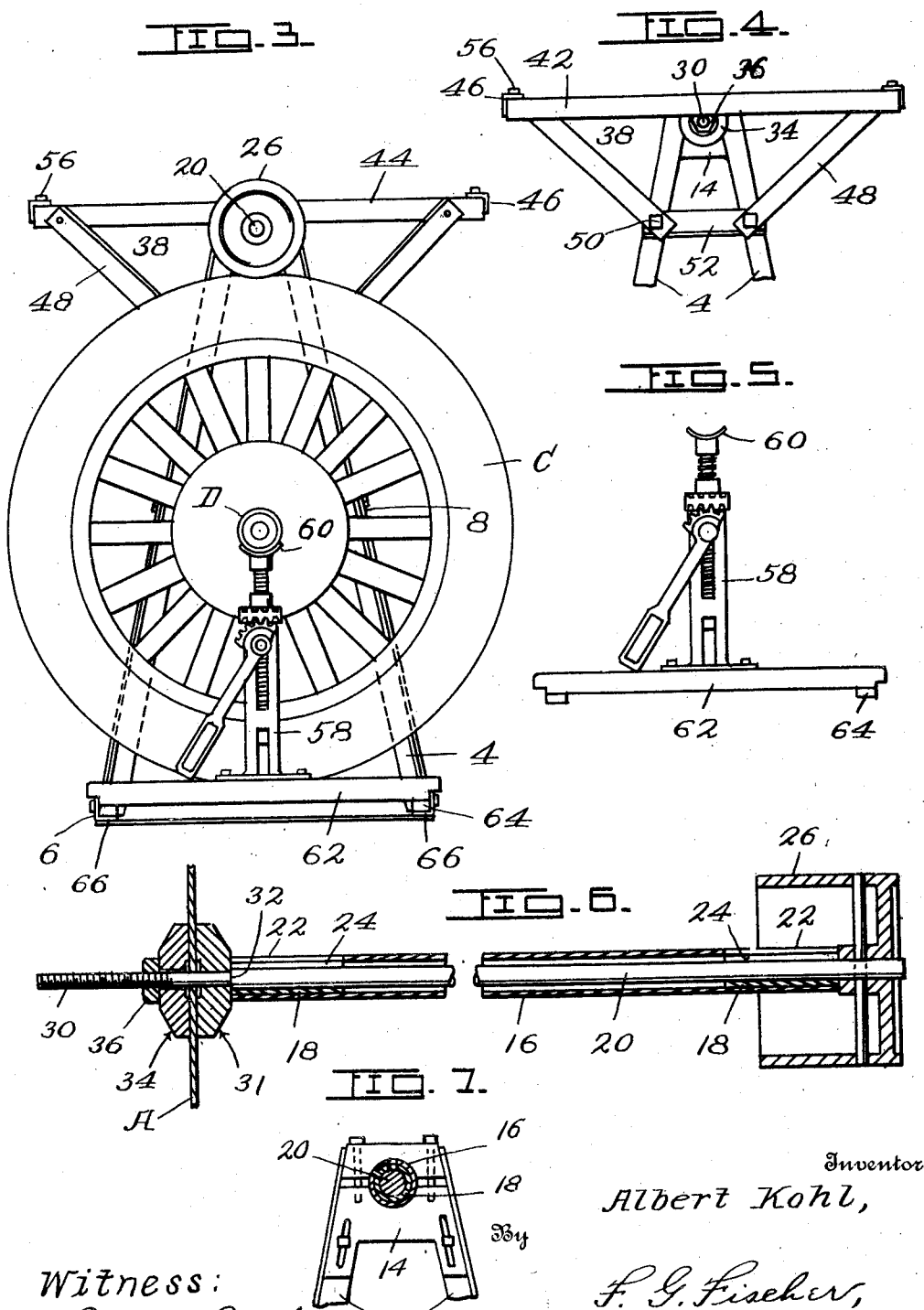
Inventor:
Albert Kohl,
By
F. G. Fischer,
Attorney.
Witness:
Fred C. Fischer.

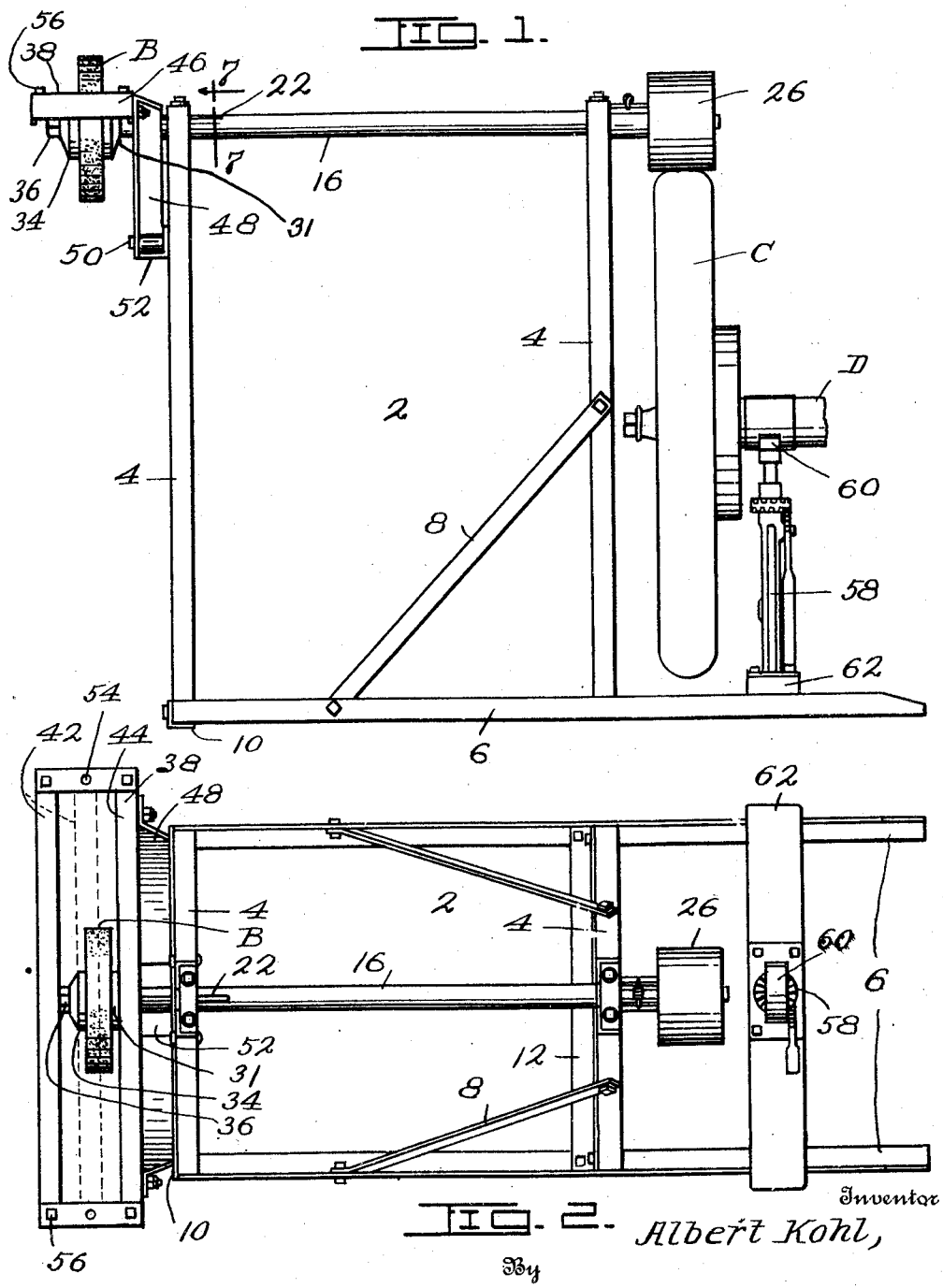

Patented Sept. 24, 1929

1,729,045

UNITED STATES PATENT OFFICE

ALBERT KOHL, OF PLEASANTON, KANSAS

POWER-TRANSMITTING ATTACHMENT FOR MOTOR VEHICLES

Application filed August 2, 1926. Serial No. 126,600.

My invention relates to a portable power unit whereby a motor vehicle can be utilized for driving circular saws, emery wheels, and pulleys from which power may be transmitted for the operation of machinery of various kinds.

The invention embodies means for raising one of the rear wheels of the vehicle into frictional engagement with a drive wheel of the unit and which also firmly anchors the latter and said vehicle in operative position.

Other features will hereinafter appear, and in order that the invention may be fully understood reference will now be had to the accompanying drawings, in which:

Fig. 1 shows a side elevation of the unit with the drive wheel thereof in frictional engagement with one of the rear wheels of a motor vehicle.

Fig. 2 is a plan view of the machine.

Fig. 3 is an end elevation of the machine with the drive wheel thereof in frictional engagement with the rear wheel of the motor vehicle.

Fig. 4 is a broken end elevation of the frame with a table mounted thereon.

Fig. 5 is a side elevation of a lifting jack employed in carrying out the invention.

Fig. 6 is a detail of a mandrel and associate parts forming part of the invention.

Fig. 7 is a fragmentary cross section on line 7—7 of Fig. 1.

Referring in detail to the different parts, 2 designates a frame which in its preferred embodiment consists of angle-iron and has two pairs of downwardly diverging legs 4, a pair of sills 6 upon which said legs 4 are mounted, a pair of braces 8 connected to one pair of legs 4 and the sills 6, and transverse members 10 and 12 connecting the sills 6.

The upper portion of the legs 4 are equipped with boxes 14 in which a stationary tubular housing 16 is firmly clamped and provided at its ends with internal bearings 18 in which a mandrel 20 is journaled. The housing 16 has longitudinal slots 22 at its ends which register with longitudinal slots 24 in the bearings 18, so that the latter can be readily supplied with lubricant and also in order to lend more or less resiliency to the ends of the housing and the bearings 18 so that the latter will snugly fit the mandrel 20. The slots 22 and 24 also enable the ends of the housing 16 and the bearings 18, respectively, to be drawn up by suitable clamping means, not shown, for the purpose of taking up the wear of said bearings 18.

The mandrel 20 is provided at one end with a fixedly mounted drive wheel 26 and near its opposite reduced end 30 with a fixedly mounted collar 31 which abuts a shoulder 32 formed by said reduced portion 30. The reduced portion 30 is threaded the major portion of its length and provided with a loose collar 34 and a nut 36 whereby a tool such as a circular saw A, or an emery wheel B, or a drive pulley, not shown, can be firmly clamped between said collars 31 and 34.

38 designates a table removably secured to the end of the frame 2 adjacent to the reduced portion 30 of the mandrel 20. The table 38 affords a convenient support for lumber or cord wood while being cut by the saw A, and said table in its preferred form embodies a pair of parallel top bars 42 and 44, a pair of short transverse bars 46 uniting said bars 42 and 44, and a pair of downwardly converging members 48 which are removably secured at their lower ends to the adjacent legs 4 by bolts 50, which also serve to hold a transverse brace 52 in position upon said legs.

The top bars 42 and 44 of the table are spaced far enough apart to admit the emery wheel B, or a pulley, but when the circular saw A is mounted upon the mandrel 20 the bar 42 is adjusted closer to the bar 44 as shown by dotted lines Fig. 2, to constitute a safety guard, holes 54 being provided in the transverse bars 46 to receive the bolts 56 which hold said bar 42 in either of its adjusted positions.

58 designates a lifting jack of any suitable type equipped at its upper end with a saddle 60 and mounted at its lower end upon a base 62 of sufficient length to span the sills 6 upon which it is adapted to rest. When in position upon the sills 6 the base 62 is held from longitudinal displacement by means of transverse bottom pieces 64, which rest upon the lower flanges 66 of the sills 6.

In practice the machine is placed in position by pushing it to the right, Fig. 1, to bring the drive wheel 26 immediately over one of the rear wheels C of a motor vehicle. The jack 58 is then placed in position with its base 62 resting upon the sills 6 and its saddle 60 spaced below the rear axle housing D. The jack 58 is then adjusted to carry the saddle 60 upwardly until it engages and lifts the axle housing D and the upper portion of the vehicle wheel C is brought firmly into frictional engagement with the under portion of the drive wheel 26. When the vehicle wheel C is revolved through the intermediary of the usual motor and transmission gearing it is apparent that it will drive the wheel 26 which in turn drives the mandrel 20 upon which the tool is mounted to accommodate the work to be performed.

As shown more clearly by Fig. 3, the sills 6 are spaced apart sufficiently so that one will extend in front and the other in the rear of the lower portion of the wheel C so that it will not be necessary to jack up the rear axle housing D until the drive wheel 26 is positioned vertically above said wheel C, and after the latter has been jacked up as described my power unit will not only be anchored firmly to the ground by the downward pressure of the jack 58, but the rear axle housing D will also be firmly anchored as it cannot rise out of the saddle 60, owing to the wheel C engaging the drive wheel 26.

As shown by Fig. 1, the sills 6 project some distance to the right of the adjacent legs 4 and the jack base 62. This arrangement causes the jack 58 to exert pressure upon the left ends of the sills 6 as well as upon the right ends of said sills, and hence any tendency of the left end of the machine to vibrate under the stress offered by the work being performed by the saw A or emery wheel B is effectually overcome.

While I have shown and described the preferred construction, combination and arrangement of parts I reserve all rights to such changes and modifications as properly fall within the spirit and scope of the invention as claimed.

Having thus described my invention, what I claim and desire to secure by Letters Patent, is:

1. In a machine of the character described, a suitable frame having a pair of sills spaced apart and projecting beyond one end of the main portion of said frame so that one sill may extend in front and the other in the rear of a rear wheel of a motor vehicle, a drive wheel associated with said frame and arranged above the projecting portions of the sills to pass over said rear wheel, a shaft driven by said drive wheel, and adjustable means for exerting downward pressure upon the projecting portions of said sills and upward pressure on the rear axle housing of the motor vehicle to hold the rear wheel of the latter in engagement with said drive wheel.

2. In a machine of the character described, a suitable frame having a pair of sills spaced apart and projecting beyond one end of the main portion of said frame so that one sill may extend in front and the other in the rear of a rear wheel of a motor vehicle, a drive wheel associated with the frame and arranged above the projecting portions of said sills to pass over said rear wheel, a shaft driven by said drive wheel and carrying a suitable tool, and a jack for exerting upward pressure on the rear axle housing of the motor vehicle to hold said rear wheel in engagement with the drive wheel, said jack having a base adapted to rest upon the projecting portions of the sills.

3. A machine of the character described consisting of a pair of legs, a stationary tubular housing uniting the upper portions of said legs, a pair of sills uniting the lower portions of said legs and projecting beyond one of the latter so that one sill may pass in front and the other in back of one of the rear wheels of an automotive vehicle, a shaft journaled in said housing and adapted to carry a suitable tool, a drive wheel mounted upon said shaft, and adjustable means adapted to rest upon the projecting portions of the sills and raise and hold the rear wheel of the vehicle in frictional contact with the drive wheel.

In testimony whereof I affix my signature.

ALBERT KOHL.